United States Patent [19]

Tang et al.

[11] Patent Number: 5,112,956

[45] Date of Patent: May 12, 1992

[54] METHOD FOR EXTRACTION OF LIPIDS AND CHOLESTEROL

[75] Inventors: Pamela S. Tang, Palatine; Norman S. Singer, Highland Park; Hsien-Hsin Chang, Lake Zurich, all of Ill.

[73] Assignee: The NutraSweet Company, Deerfield, Ill.

[21] Appl. No.: 326,467

[22] Filed: Mar. 17, 1989

Related U.S. Application Data

[63] Continuation-in-part of Ser. No. 127,402, Dec. 2, 1987, abandoned.

[51] Int. Cl.$^5$ .................... C07K 3/12; C07K 15/06
[52] U.S. Cl. ......................... 530/424; 530/359; 530/361; 530/833; 530/853; 514/2; 514/12; 426/531; 426/583; 426/614; 426/656; 426/657; 210/634; 210/767; 554/21
[58] Field of Search ............... 530/424, 362, 260, 361, 530/422, 833, 359, 853; 260/412, 412.3, 424, 412.8; 426/602, 605, 614, 652, 442, 531, 583, 656; 210/634, 767

[56] References Cited

U.S. PATENT DOCUMENTS

| 4,219,469 | 8/1980 | Kadan et al. | 530/377 |
| 4,234,619 | 11/1980 | Yano et al. | 426/614 |
| 4,734,287 | 3/1988 | Singer et al. | 426/41 |

FOREIGN PATENT DOCUMENTS 0027514 4/1981 European Pat. Off. ............ 530/424

OTHER PUBLICATIONS

Duwe et al., "Destruction of Lipids from Isolates of Microbiol Protein", Chemical Abstracts, vol. 105, p. 565, Ref. #151519p, 1986.
Larson et al., "Extraction and Processing of Various Components from Egg Yolk", Poultry Science, 1981, 60(1) pp. 160–167.

*Primary Examiner*—F. T. Moezie
*Assistant Examiner*—Andrew G. Rozycki
*Attorney, Agent, or Firm*—John M. Sanders

[57] ABSTRACT

The present invention relates to a method for the removal of lipids and cholesterol from protein materials comprising the steps of (a) treating the protein with an extraction mixture comprising a lower alcohol, water and an acid, in concentrations selected to extract cholesterol and lipids from the protein, and (b) removing the extraction mixture from the protein.

9 Claims, No Drawings

METHOD FOR EXTRACTION OF LIPIDS AND CHOLESTEROL

CROSS-REFERENCE TO RELATED APPLICATIONS

This application is a continuation-in-part of application Ser. No. 07/127,402, filed Dec. 2, 1987, now abandoned.

BACKGROUND

The present invention relates generally to i methods for the extraction of lipids and cholesterol from food protein. More specifically, the invention relates to methods for the removal of fat and cholesterol from undenatured protein materials such that the product protein is suitable for human consumption, does not have its flavor adversely affected and is neither denatured nor has its functionality altered or destroyed.

Dairy whey, and generally all animal proteins, are associated with lipids which typically include cholesterol. The lipid content of whey protein concentrate is generally about 8% although various grades of whey protein have lipid contents as low as 4% or even 2%. Dried dairy whey protein also comprises from about 100 to 200 mg cholesterol/100 g whey protein concentrate. Egg yolk is particularly high in fat and cholesterol and comprises about 40–45% lipid and about 2500 mg cholesterol/100 g of material.

Various methods are known for the extraction of lipids and cholesterol from dairy and other protein materials. Christie, William W., Lipid Analysis, pp. 30–41, 176–197 (1973) discloses the use of various solvents and solvent mixtures for the extraction of lipids from animal, plant or bacterial tissues. A preferred solvent is disclosed to be a 2:1 (v/v) mixture of chloroform and methanol. This solvent system is said to be capable of readily extracting most simple and complex lipids although the addition of acid or inorganic salts is said to be required for the extraction of polyphosphoinositides of brain tissue. Other solvents are disclosed to include ethanol which is said to be effective for the extraction of lipids from liver homogenates; ethanol and diethyl ether which are useful for the removal of lipids from lipoprotein fractions; methanol and water; and chloroform, methanol and water. Solvents containing ethyl ether and chloroform are generally effective at extracting lipids and cholesterol but tend to leave undesirable residues which make the product material unsuitable for human consumption. The problem of toxic residues may, in part, be avoided by use of solvents such as hexane or alcohols. Such solvents tend, however, to be less effective in the extraction of fat and cholesterol than the more toxic solvents.

Hubbard, et al., J. Amer. Oil Chemists Soc., 54, 81–83, (1977) disclose methods for the extraction of cholesterol, fat and fatty acids from food products. The methods involve digestion of sample materials with HCl and extraction with solvents such as ethyl ether, a 2:1 solution of chloroform and methanol and solutions of chloroform, methanol and water. Such solvents are generally effective at extracting lipids and cholesterol but tend to leave undesirable residues which make the product material unsuitable for human consumption.

Kasahara, et al., U.S. Pat. No. 4,295,853 issued Oct. 20, 1981, disclose methods for assaying of lipoperoxides wherein the lipoperoxides are extracted by means of solvents such as alcohols, ketones, hydrocarbons and solvents such as dimethylsulfoxide and dimethyl formamide. An extraction solvent comprising ethanol and carbon tetrachloride is identified as being particularly preferred. Unfortunately, the use of carbon tetrachloride also tends to leave undesirable residues, rendering the product material unsuitable for human consumption.

Melnick, U.S. Pat. No. 3,563,765 issued Feb. 16, 1971, discloses methods for the extraction of fat and cholesterol from egg yolk using non-polar solvents such as hexane, cyclohexane, heptane, trichloroethylene and the like. The reference states that when extracting egg yolk solids with non-polar solvents, there appears to be little, if any, damage to the functional properties of the remaining protein. More efficient extraction is said to be possible where a polar solvent such as an alcohol is used to disrupt lipid-protein bonds, thus permitting the subsequent extraction of lipids by a non-polar solvent such as ethyl ether. Alternatively, the two processes may be combined through use of solvent mixtures such as ethanol-ether.

Such extraction methods are of limited utility when it is intended to utilize the reduced lipid/cholesterol containing protein material as a base for food products. The use of materials such as chloroform as solvents in food processing is generally unsuitable where their presence in food products is limited by health concerns. The use of some solvents, including chloroform, also causes denaturation of food proteins, thus rendering the product materials unsuitable for certain uses. Hexane is widely utilized for the removal of lipids from egg and soy protein material but solubilizes relatively little cholesterol present in whey protein concentrate. Absolute ethanol is generally acceptable for use as a solvent in food protein products, but is a relatively poor solvent for cholesterol.

Of interest to the present invention is the disclosure of U.S. Pat. No. 4,734,287, which discloses methods for the production of proteinaceous water-dispersible macrocolloid whey particles which in a hydrated state have a substantially smooth, oil-in-water emulsion-like, organoleptic character. The methods for production of the macrocolloid material involve heating undenatured and substantially soluble whey protein concentrate in the presence of selected ingredients under high shear conditions to form substantially spheroidal particles. It is critical that prior to processing to produce the macrocolloid material that the protein premix remain undenatured and substantially soluble. It is thus important that preprocessing steps not cause denaturation or adversely affect the solubility of the protein. Moreover, any preprocessing steps should be consistent with the use of the product as an ingredient in foodstuffs and should not create undesirable flavors, odors or color and should not leave residues of toxic or other undesirable chemical components in the product.

SUMMARY OF THE INVENTION

The present invention relates to a method for the removal of lipids, cholesterol and undesirable flavors, odors and color from protein materials such as whey comprising the steps of; (a) treating the protein with a polar extraction solvent comprising a lower alcohol, water and an acid in concentrations selected to extract cholesterol and lipids from the protein, and (b) removing the extraction solvent from the protein. The method removes substantial portions of lipid material from the treated protein and can reduce cholesterol levels in the product by as much as 90% or more.

The method also provides improved aroma and flavor characteristics by removing components which create undesirable flavors and odors. This makes the extracted material particularly useful for use in food products for human consumption.

DETAILED DESCRIPTION

The present invention provides improved protein materials including a whey protein concentrate product with substantially reduced fat and cholesterol levels along with improved flavor and aroma properties. Processing of the whey protein according to the methods of the invention does not appear to interfere with the functionality of the whey protein and also appears to provide improved properties to the protein concentrate for use in the production of macrocolloid proteinaceous fat substitutes. Removal of significant proportions of fat and cholesterol along with various undesirable odor and flavor producing components also makes the extracted protein materials of the invention particularly useful for use in a variety of other food products. As one example, the extraction procedure also provides improved processing characteristics to extracted proteins such as whey when used for the production of macrocolloid materials useful as fat substitutes according to the methods of U.S. Pat. No. 4,734,287 and U.S. Ser. No. 127,955 filed Dec. 2, 19987 filed herewith.

The method involves carrying out an extraction using a polar solvent comprising a lower alcohol, water and a small amount of acid. Specifically, the polar extraction solvents of the invention primarily comprise a lower alcohol at concentrations from about 90% to about 97% (by weight), water at concentrations from about 3% to about 10% (by weight), and an acid at concentrations from about 0.010% to about 1% (by weight) and preferably from about 0.010% to about 0.20% (by weight). Unless otherwise noted, all percentages expressed herein are weight percentages. A preferred solvent for maximizing the extraction of fat and cholesterol from whey comprises 90.9% ethanol, 9% water and 0.084% citric acid. Extraction with this solvent is preferably carried out for 6 hours at 52° C. A preferred solvent for reducing fat and cholesterol levels while providing optimum flavor and processing characteristics for producing macrocolloid materials useful as fat substitutes comprises 94.95% ethanol, 5.0% water and 0.050% citric acid. Extraction with this solvent is preferably carried out for 4 hours at 40° C.

Ethanol is particularly preferred for use with the invention because of its suitability with food ingredients and lack of toxicity when present in minor amounts. Nevertheless, other lower alcohols such as methanol, normal and iso-propanal and the various butanol isomers are expected to be useful with the present invention.

Food grade acids such as citric, acetic, phosphoric, tartaric, malic, lactic and fumaric are acceptable for use with the present invention. Malic, acetic and citric acid are particularly preferred. Hydrochloric acid (HCl), on the other hand is not suitable for use with the invention. The acids may range in concentration from about 0.010% to about 1% (by weight) and preferably from about 0.01% to about 0.20% by weight with about 0.05% being particularly preferred. Whatever amount of acid is incorporated, the pH of the extraction solvent should not be allowed to fall below about 4 because of the tendency of proteins to denature at such pH values. The extraction solvent is preferably maintained at a pH of about 5.0.

The extraction is carried out by mixing dry proteins such as whey protein concentrate with the extraction solvent with the ratio of solvent to protein preferably being about 3:1 by weight. The mixture is subjected to constant agitation for a period of time sufficient to permit extraction of a major portion of the fat and cholesterol along with various undesirable odor and flavor producing components. The extraction may be carried out at room temperature, but is preferably conducted at an elevated temperature not in excess of 60° C. Temperatures greater than 60° C. tend to denature the protein. According to one preferred method, the mixture is agitated for four to five hours at a temperature of 52° C.

As would be well recognized by those of skill in the art, the rate of extraction can be increased by increasing the degree of agitation to which the protein is subjected in the presence of the extraction solvent. Where the methodology of increasing agitation is carried out to its extreme, the protein and the extraction solvent are mixed under high shear conditions such as in a blender. According to such a procedure, the mixture of protein and extraction solvent may be agitated under high shear conditions for periods of less than 20 minutes and ranging down to as little as 2 minutes. The protein may be treated at ambient temperature although the temperature of the protein material can rise due to the generation of heat in the high shear environment. While such a high shear methodology is capable of removing substantial levels of lipids and cholesterol from protein materials, caution must be had so as not to denature or interfere with the functionality of treated protein materials or introduce undesirable odors or flavors by the application of excessive shear and/or heat to the protein material.

After the extraction, the protein is separated from the solvent by filtration and is washed once or more with a solvent such as 95% ethanol in a volume roughly double the initial dry weight of the protein. The filtered solids, thus freed of excessive solvent are dried, according to methods known in the art. Drying is preferably carried out under a vacuum with a purge of air or nitrogen at a temperature between about 45° and 60° C. and may be carried out in as little as six hours.

The steps of the extraction process are preferably performed consistent with promoting the removal of undesirable flavors, odors and colors and with preventing the formation of such undesirable flavors, odors and colors. The presence of such undesirable flavors, odors and colors in the macrocolloid protein products of U.S. Pat. No. 4,734,287 is related to their presence in the protein starting materials which is frequently determined by the "freshness" of the material. Protein sources which are generally considered "fresh" by the art may nevertheless contain levels of off-flavors which would render the macrocolloid produced through use of the protein unsuitable for use in delicately flavored food products. As an example, while whey protein concentrate up to one year old is generally considered by the art to be fresh, such whey protein concentrate greater than three months old is generally unsuitable for use in the production of macrocolloid which is to be used in the production of such delicately flavored products, as for instance, vanilla flavored frozen desserts. While the method of the present invention can remove substantial levels of undesirable flavors, odors and colors from protein materials such as whey, it is nevertheless preferred that the protein source material be as fresh as possible prior to the extraction.

During extraction, it has been found that recycling solvent recovered from previous wash steps may introduce off-flavors and colors to the protein being processed. While it may be impractical economically to wash with 100% fresh solvent, it is important that the concentration of impurities in the solvent stream be monitored and that the solvent be purified or at least purged and replenished in order to prevent tainting of the protein product.

A cause of undesirable flavor, odor and color production has been found to be oxidation of the protein and the lipids associated therewith caused by the presence of oxygen at the elevated temperatures at which extraction of lipids and cholesterol preferably takes place. It is thus desired that oxygen be separated from the protein and extraction solvent. This is preferably accomplished by use of a properly designed inert gas, preferably nitrogen, purge system. Therefore, all subsequent references to oxidation of protein are intended to include the oxidation of the residual lipids as well as the protein with which they are associated.

Production of off-flavors and color can also occur when the moisture content of the extracted protein is lowered to too great an extent. The moisture content of whey protein concentrate is preferably maintained at about 2% to 4%. Excessive reduction of the moisture content tends to result in the degradation of the whey and other protein and the production of undesirable flavors, odors and color.

Excessive alcohol residues associated with the protein are undesired because they not only limit the solubility of the protein, but also directly adversely affect the aroma. Generally, an alcohol content of less than about 0.2% is not detrimental to the protein.

Example 1

According to this example, an extraction procedure was carried out for the removal of fat and cholesterol from whey protein concentrate. Specifically, a reactor was charged with 181 kg of absolute ethanol (Lot Nos. 16468x, 16995x, Aaper Alcohol & Chemical Co., Shelbyville, KY). Water (8.58 kg) and 954 grams of a 10% citric acid solution (Miles Laboratories, Elkhart, Indiana) were then ,added and the solution comprising 94.95% ethanol, 5% water and 0.5% citric acid was agitated for about two minutes. The aforementioned percentage values and all percentage values used in the following examples are weight percent. The pH of the solution was then measured to confirm that it was pH $5.0 \pm 0.5$.

One hundred and forty pounds (63.5 kg) of whey protein concentrate WPC-50 (lot 6302-2, Fieldgate, Litchfield, MI) was then added to the reactor and the reactor was sealed. Steam was then admitted to the reactor jacket and the reactor temperature was maintained at 40°-42° C. for 4 hours. The protein slurry was removed from the reactor and filtered on a continuous belt filter allowing the cake thickness to reach 1 inch. The collected cake weighed 116 kg. The reactor was charged with 127 kg of 95% ethanol and the wet cake was added to the reactor to form a slurry which was mixed for 20 minutes. The slurry was then removed, filtered as before, and the collected cake was again added to the reactor charged with 127 kg of 95% ethanol. The slurry was mixed for 20 minutes and was then filtered with care taken to remove as much liquid as possible. The wet cake weighed 109.0 kg.

The wet cake was then placed in trays to a uniform depth of 1 inch or less and the material was dried under vacuum for 84 hours at temperature of $45° \pm 1°$ C. This operation provides 55.5 kg of whey protein concentrate material for a yield of 87.4%. Calculating that approximately 3.5 kg of material had been lost in the dryer, the percentage of volatiles in the initial wet cake was calculated to be 45.9%. The resulting material had a protein concentration of 54.8%.

The solubility of the protein is measured by dispersing 10 grams of protein in 190 grams of the selected solvent system in a Waring blender for one or two minutes. The resulting dispersion is divided into two portions. One such portion is centrifuged for 25 minutes in a Beckman L8-70 centrifuge using an SW-55 rotor (Beckman, Palo Alto, CA) at 11,000 r.p.m. (17,000 g) and 22° C . The soluble protein content is then determined as follows. Protein contents of both the uncentrifuged portion (Solution No. 1) and the supernatant of the centrifuged portion (Solution No. 2) are determined using data from a Carlo Erba Nitrogen analyzer (Model 1500, Milan, Italy). The percent solubility is thus calculated according to the formula:

$$\% \text{ Soluble Protein} = \frac{\% \text{ Protein in Solution No. 2}}{\% \text{ Protein in Solution No. 1}} \times 100$$

According to this method, the resulting protein had a solubility of 95%. Analysis of the whey protein product indicated a cholesterol content of 51.1 mg/100 g product compared with an initial content of 150 mg/100 g. Fat content was reduced from 2.0% to 0.4%.

EXAMPLE 2

According to this example, a preparation of the whey protein concentrate utilized in Example 1 (FDA WPC-50 Lot 6302) with a fat concentration of 2%, a cholesterol content of 150.0 mg/100 g and a protein content of 55% was slurried in three times its weight of an extraction solvent mixture comprising 94.95% ethanol, 5% water and 0.05% citric acid. The pH of the slurry was 6.22 and temperature was maintained at 40° C for four hours while the slurry was agitated. The solvent was then filtered to separate the solid from the solvent mixture. The solid was then reslurried in an amount of 95% ethanol double the initial weight of the whey protein and refiltered. This procedure was repeated twice. The filter cake was then dried in a vacuum oven at 52 mm Hg at 45° C with constant purging of air for 24 hours to remove the residual ethanol. The filtrate was combined and distilled for reuse in other extractions. The residue was collected and cleaned by dialysis and distillation as a by-product.

Analysis of the whey protein, both before and after the extraction treatment (See Table 1 below) indicated that the fat content of the whey protein was reduced from 2.0% to 1.1% while cholesterol concentration was reduced from 150.0 mg/100 g to 29.6 mg/100 g.

Other whey protein concentrate samples, including those with 35%, 75% and 95% protein concentrations, were treated according to the procedure described above with the results shown in Table 1.

TABLE 1

Analytical Data of Extracted Whey Protein Concentrate (WPC)

| Sample Description | Cholesterol (mg/100 g) | | Fat (%) | |
|---|---|---|---|---|
| | Untreated | Extracted | Untreated | Extracted |
| FDA WPC-50[a] (Lot 6302) | 150.0 | 29.6 | 2.0 | 1.1 |
| FDA WPC-50[a] (Lot 7076) | 160.0 | 83.8 | 3.0 | 1.8 |
| FDA WPC-50[a] (Lot 7215) | 156.0 | 15.6 | 1.8 | 0.2 |
| Express-50[b] (Lot 6B129A) | 165.0 | 58.6 | 2.9 | 2.0 |
| Express-75[c] (Lot 6t218B292) | 253.0 | 66.7 | 5.3 | 3.2 |
| BiPro-95[d] (Lot 132-B6SP-P-95) | 30.7 | 10.3 | 1.1 | 0.2 |
| Saputo-35[e] (Lot 12-015-16) | 110.0 | 15.8 | 1.8 | 0.7 |

[a] WPC; 50% protein (Fieldgate, Litchfield, MI)
[b] WPC; 50% protein (Express Foods, Louisville, KY)
[c] WPC; 75% protein (Express Foods, Louisville, KY)
[d] WPC; 95% protein (LeSueur Isolates, LeSueur, MN)
[e] WPC; 35% protein (Les Fromages Saputo Limitee, St. Hyacinthe, Quebec)

EXAMPLE 3

According to this example, a preparation of the whey protein concentrate utilized in Example 1 (FDA WPC-50 Lot 6302) with a fat concentration of 2%, a cholesterol content of 150.0 mg/100 g and a protein content of 55% was slurried in three times its weight in an extraction solvent comprising 94.94% ethanol, 5% water and 0.06% citric acid. The pH of the slurry was 5.17 and temperature was maintained at 50° C for four hours while the slurry was agitated. The solvent was then filtered to separate the solid from the solvent mixture. The solid was then reslurried in an amount of 95% ethanol double the initial weight of the whey protein and refiltered. This procedure was repeated twice. The filter cake was then dried in a vacuum oven at 52 mm Hg at 45° C. with constant purging of air for 24 hours to remove the residual ethanol.

Analysis of the whey protein, both before and after the extraction treatment (See Table 2 below) indicated that the fat content of the whey protein was reduced from 2.0% to 0.7% while cholesterol concentration was reduced from 150.0 mg/100 g to 9.4 mg/100 g. The percentage of protein present increased, primarily as a result of lipid reduction and dehydration while the solubility of the protein material remained essentially unchanged. Differential scanning calorimetry (DSC), infrared (IR) spectroscopy and ultraviolet (UV) spectroscopy as well as one and two dimensional gel electrophoresis indicated no significant denaturation or modification of the protein molecules. However, the disappearance of the shoulder peak at 1745 cm$^1$ in the IR spectrum of the extracted whey protein concentrate clearly reflected the reduction in lipid content. The aroma and flavor of the protein material was also judged to have improved.

TABLE 2

Analysis of WPC and Extracted WPC

| | Untreated Whey Protein | Extracted Whey Protein |
|---|---|---|
| Protein (%) | 55.8 | 59.0 |
| Solubility (%) | 96.0 | 94.0 |
| Fat (%) | 2.0 | 0.7 |
| Cholesterol (mg/100 g) | 150.0 | 9.4 |
| DSC | 2.87 J/g, 4.35 J/g | 1.56 J/g, 4.15 J/g |
| IR | 1540 CM$^{-1}$, 1560 CM$^{-1}$ 1745 CM$^{-1}$,(sh) [LIPID] | 1540 CM$^{-1}$, 1560 CM$^{-1}$ |
| UV | 279 nm, 290 nm sh | 279 nm, 290 nm sh |
| Aroma | Medium to High Intensity, Stale, Rancid | Medium Intensity, Skim Milk-Like, Slight Oxidized Note |
| Flavor | Raw Green, Salty, Cardboard, Dairy, Unpleasant After Taste, Mushroom | Dairy, Sweet with Sharp Note, Slightly Sour, Oxidized Cardboard Note |

EXAMPLE 4

According to this example, a four-factor, second-order response surface experiment consisting of 19 experimental points was conducted. Whey protein concentrate samples from the same lot used in Example 1 (WPC-50, lot 6302-2, Fieldgate, Litchfield, MI) were treated with a polar extraction solvent comprising ethanol, water and citric acid. Factors which were varied were time, temperature and the water and acid concentrations. The extraction products were analyzed to determine concentrations of cholesterol, lipids, protein, lactose and water. The solubility and color of the products were also determined.

The data were fit using regression techniques to a multivariable model according to the requirements that: (1) the overall F-ratio associated with the regression equation is significant and the alpha=0.05 level of significance; (2) the multiple $R^2$ value is greater than 0.75 ($R^2$ measures the proportion of the total variability observed in the data that is explained by the regression equation); and (3) each term in the regression equation is significant at the alpha 0.30 level of significance. Acceptable predictive equations were found for fat content, lactose content, solubility and color-L and color-A.

According to the specific data points, it is revealed that the concentration of fat is minimized at time=6 hours, temperature=52° C., water concentration of 9% and citric acid concentration of 0.084%. Under these conditions, solubility is predicted to be approximately 95%, lactose concentration is predicted to be approximately 27.7%, color-L is predicted to be approximately 97.0 and color-A is predicted to be approximately −1.57. Generally, the data indicate that fat concentrations are minimized by processing temperatures ranging from about 50° C. to about 53° C. and that the fat concentration is minimized by maximizing the extraction time. The data also indicate that the product fat concentration decreases with increasing water concentration with the solvent.

Solubility of the extracted protein tends to decrease with increasing acid concentrations. The relationship between solubility and time and temperature is more problematic with higher solubilities indicated at low acid, low temperature and short time conditions.

Lactose concentrations in the product are decreased with increasing extraction time and temperature. Increasing concentrations of acid are indicated to cause slight decreases in lactose concentration in the product although such extraction of lactose is too low to be of commercial utility.

With respect to color formation, the magnitude of color-L, representing the whiteness of the product material with higher numbers representing a whiter product, is indicated to increase with increasing extraction temperature and time and increasing water concentrations in the extraction solvent. Color-A, representing the redness of the product with higher numbers representing a redder product, was found to decrease with increasing extraction temperature and time and increasing water concentration in the extraction solvent. Color-B, representing the yellowness of the product with higher numbers representing a yellower product, was not shown to be affected by variation of the selected process variables.

In the course of conducting the above experiment, it was found that conducting the extraction procedure for 4 hours at 40° C. produces a material with optimum characteristics for production of a macrocolloid food material with preferred flavor and texture characteristics. At extraction conditions of 4 hours and 40° C., the model obtained by regression analysis indicates that the fat concentration of the product is minimized by increasing acid and water concentrations in the extraction solvent. Increasing acid concentrations in the extraction solvent are indicated to decrease solubility and the lactose concentration of the finished product. Increasing water concentrations in the extraction solvent are indicated to decrease the magnitude of color-A while increasing the magnitude of color-L.

bated with the extraction solvent for 4 hours at 40° C. The material was then washed with a 95% ethanol solution. The extracted egg yolk had a fat concentration of 21.4% and contained 522 mg cholesterol per 100 grams of the material compared with the untreated material which had a fat concentration of 42.6% and a cholesterol concentration of 2460 mg/100 grams of material.

EXAMPLE 6

According to this example, a preparation of whey protein concentrate having a protein concentration of about 57.8%, a cholesterol concentration of 146 mg/100 g and a fat concentration of 3.7% was treated with two extraction solvents according to the invention and with various extraction solvents outside the scope of the invention. Extractions were made with 3:1 (by weight) ratios of solvent to whey protein concentrate at 40° C. Extraction solvents used not within the scope of the present invention were pure hexane, pure ethanol, pure ethyl acetate and a solution of ethanol and HCl having a pH of 5.1. Extraction solvents within the scope of the invention were a solution of ethanol and aqueous acetic acid having a pH of 5.17 and a solution of ethanol and aqueous citric acid having a pH of 4.9. 1

The extractions utilizing pure hexane, ethanol with acetic acid and ethanol with citric acid were carried out for 4 hours. The extraction with ethyl acetate was carried out for 5 hours and the extractions with pure ethanol and with ethanol in combination with HCl were carried out according to procedures whereby the whey protein concentrate was extracted once for 4 hours and then again for another 4 hours. According to the results shown in Table 4 below, only the procedures utilizing ethanol with acetic acid and ethanol with citric acid provided significant reductions in cholesterol and fat concentrations. All experiments represented in this ex-

TABLE 3

| Sample No. | Extraction Time (Hrs) | Extraction Temp (°C.) | Extraction H₂O (%) | Citric Acid (%) | pH of Slurry | Cholesterol (mg/100 ml) | Lipids (%) | Protein (%) | Lactose (%) | H₂O (%) | Solubility (%) | Color L | Color A | Color B |
|---|---|---|---|---|---|---|---|---|---|---|---|---|---|---|
| Untreated | n.a. | n.a. | n.a. | n.a. | n.a. | 150.0 | 2.0 | 55.8 | 26.8 | 2.39 | 96 | 94.4 | −1.30 | 7.48 |
| 1 | 4.0 | 60 | 7.5 | 0.060 | 6.80 | 10.0 | 1.0 | 58 | 26.2 | 2.22 | 90 | 96.4 | −1.54 | 8.46 |
| 2 | 2.0 | 50 | 7.5 | 0.060 | 6.17 | 6.1 | 0.7 | 58 | 29.8 | 2.10 | 94 | 96.4 | −1.53 | 6.77 |
| 3 | 4.0 | 50 | 5.0 | 0.060 | 5.98 | 9.4 | 0.7 | 59 | 28.0 | 2.94 | 94 | 95.9 | −1.62 | 7.55 |
| 4 | 2.8 | 44 | 6.0 | 0.036 | 6.44 | 14.7 | 1.1 | 54 | 29.1 | 1.98 | 98 | 94.8 | −1.47 | 8.01 |
| 5 | 2.8 | 56 | 9.0 | 0.036 | 6.50 | 6.2 | 0.4 | 62 | 28.4 | 2.38 | 93 | 96.0 | −1.56 | 8.33 |
| 6 | 6.0 | 50 | 7.5 | 0.060 | 6.89 | 7.2 | 0.2 | 58 | 27.8 | 2.06 | 90 | 97.2 | −1.55 | 6.64 |
| 7 | 4.0 | 50 | 7.5 | 0.060 | 6.46 | 7.6 | 0.3 | 57 | 27.8 | 3.52 | 94 | 96.0 | −1.63 | 7.54 |
| 8 | 4.0 | 50 | 7.5 | 0.060 | 6.50 | 6.8 | 0.6 | 61 | 28.0 | 1.84 | 93 | 96.1 | −1.71 | 7.84 |
| 9 | 5.2 | 44 | 6.0 | 0.084 | 5.96 | 18.0 | 0.9 | 61 | 28.4 | 1.68 | 91 | 95.0 | −1.60 | 7.93 |
| 10 | 4.0 | 40 | 7.5 | 0.060 | 6.40 | 13.5 | 0.9 | 60 | 28.9 | 1.71 | 96 | 95.6 | −1.54 | 7.11 |
| 11 | 2.8 | 44 | 9.0 | 0.084 | 6.24 | 14.5 | 0.9 | 59 | 29.3 | 2.47 | 91 | 95.8 | −1.70 | 7.67 |
| 12 | 4.0 | 50 | 7.5 | 0.100 | 5.73 | 8.2 | 0.2 | 59 | 28.2 | 1.84 | 98 | 96.3 | −1.67 | 7.39 |
| 13 | 5.2 | 56 | 9.0 | 0.084 | 6.25 | 11.2 | 0.1 | 57 | 27.1 | 3.03 | 97 | 97.5 | −1.45 | 6.77 |
| 14 | 4.0 | 50 | 10.0 | 0.060 | 6.33 | 12.7 | 0.3 | 59 | 28.8 | 2.38 | 92 | 96.4 | −1.70 | 7.80 |
| 15 | 2.8 | 56 | 6.0 | 0.084 | 5.83 | 10.2 | 0.6 | 58 | 28.8 | 1.56 | 88 | 96.1 | −1.61 | 7.70 |
| 16 | 5.2 | 56 | 6.0 | 0.036 | 6.36 | 12.8 | 0.7 | 59 | 27.3 | 2.66 | 96 | 96.5 | −1.60 | 8.07 |
| 17 | 4.0 | 50 | 7.5 | 0.020 | 6.23 | 11.2 | 0.6 | 63 | 29.3 | 1.69 | 98 | 96.2 | −1.72 | 7.75 |
| 18 | 4.0 | 50 | 7.5 | 0.060 | 5.87 | 11.6 | 0.4 | 58 | 28.6 | 1.82 | 93 | 96.1 | −1.68 | 7.69 |
| 19 | 5.2 | 44 | 9.0 | 0.036 | 6.22 | 13.2 | 0.7 | 59 | 28.8 | 2.40 | 92 | 96.1 | −1.68 | 7.38 |

EXAMPLE 5

According to this example, cholesterol was extracted from dried egg yolk according to the method of the invention. Cholesterol was extracted from egg yolk with a solvent comprising 95% ethanol, 0.03% citric acid and 4.97% water. The egg yolk solids (Henningsen Foods, Type Y-1-FF, White Plains, NY) were incuample were conducted on the same lot of WPC-50 (lot 6135-17, Fieldgate, Litchfield, MI).

TABLE 4

| Sample No. | Extraction Solvent | Extraction Time | Cholesterol (mg/100 g) | Fat (%) |
|---|---|---|---|---|
| Untreated | — | — | 146 | 3.7 |

TABLE 4-continued

| Sample No. | Extraction Solvent | Extraction Time | Cholesterol (mg/100 g) | Fat (%) |
|---|---|---|---|---|
| 1 | hexane | 4 hr. | 127 | 2.9 |
| 2 | ethanol | 4 hr. × 2 | 100 | 3.0 |
| 3 | ethyl acetate | 5 hr. | 153 | 3.7 |
| 4[a] | ethanol + HCl | 4 hr. × 2 | 133 | 3.0 |
| 5[b] | ethanol + acetic | 4 hr. | 49.3 | 3.4 |
| 6[c] | ethanol + citric | 4 hr. | 12.9 | 0.9 |
| 7[d] | ethanol + acetic | 4 hr. | 20.0 | 1.1 |
| 8[e] | ethanol + acetic | 4 hr. | 18.0 | 2.4 |

[a]ethanol (96.97%)/HCl (0.1 N; 0.03%)/H$_2$O (3.0%)
[b]ethanol (93.75%)/acetic acid (0.65%)/H$_2$O (5.6%)
[c]ethanol (95%)/citric acid (0.2%)/H$_2$O (4.8%)
[d]ethanol (94.7%)/acetic acid (0.3%)/H$_2$O (5.0%)
[e]ethanol (93.7%)/acetic acid (1.0%)/H$_2$O (5.3%).

EXAMPLE 7

According to this example, a preparation of whey protein concentrate (lot 7232) having a protein concentration of about 53.9%, a cholesterol concentration of 140.0 mg/100 g and a fat concentration of 3.0% was treated with extraction solvents comprising various food grade acids according to the invention. Extractions were made with 3:1 (by weight) ratios of solvent to whey protein concentrate for 4 hours at 40° C. According to the results shown in Table 5 below, each of the procedures utilizing ethanol and water in communication with either lactic, malic, fumaric, ascorbic, tartaric or phosphoric acids provided significant reductions in cholesterol and fat concentrations in the protein.

TABLE 5

| Sample No. | Extraction Acid | Acid (%) | Extraction H$_2$O (%) | pH of Solvent | Cholesterol (mg/100 g) | Fat (%) |
|---|---|---|---|---|---|---|
| 1 | Lactic | 0.15 | 5.0 | 4.15 | 37.0 | 1.6 |
| 2 | Lactic | 0.15 | 5.0 | 4.15 | 29.5 | — |
| 3 | Malic | 0.03 | 5.2 | 4.13 | 36.4 | 2.0 |
| 4 | Malic | 0.03 | 5.2 | 4.13 | 36.6 | 3.0 |
| 5 | Fumaric | 0.02 | 5.1 | 4.38 | 75.5 | 1.9 |
| 6 | Ascorbic | 0.10 | 5.0 | 4.51 | 25.0 | 1.9 |
| 7 | Tartaric | 0.05 | 5.0 | 4.07 | 11.4 | 0.4 |

EXAMPLE 8

According to this example, 100 to 300 gram samples of a preparation of whey protein concentrate (to 7232) having a protein concentration of about 53.9%, a cholesterol concentration of 140 mg/100 g and a fat concentration of 3.0% were treated under high shear conditions in blenders (1 quart/11,000 rpm or 2 gallon/20,000 rpm). Extractions were made with 3:1 (by weight) ratios of solvent to whey protein concentrate with an extraction solvent comprising 94.95% ethanol, 5.0% water and 0.05% citric acid. Samples were subjected to extraction periods of varying time lengths with the results shown in Table 6 below.

TABLE 6

| Sample No. | Extraction Time (min) | Blender Size | Cholesterol (mg/100 g) | Fat (%) | Protein (%) |
|---|---|---|---|---|---|
| Untreated | — | — | 140.0 | 3.0 | 53.9 |
| 1 | 20 | 1 quart | 5.6 | <.1 | 54.5 |
| 2 | 3 | 1 quart | 126.0 | 2.8 | 53.7 |
| 3 | 5 | 1 quart | 36.2 | 2.1 | 54.6 |
| 4 | 10 | 1 quart | 11.3 | 0.5 | 54.5 |
| 5 | 8 | 2 gal. | 131.0 | 2.8 | 56.3 |
| 6 | 10 | 2 gal. | 8.0 | 0.7 | 53.7 |
| 7 | 10 | 2 gal. | 13.3 | 1.7 | 53.2 |
| 8 | 10 | 2 gal. | 85.4 | 3.4 | 53.9 |

Numerous modifications and variations in practice of the invention are expected to occur to those skilled in the art upon consideration of the foregoing descriptions of preferred embodiments thereof. Consequently, only such limitations should be placed upon the scope of the invention as appear in the appended claims.

What is claimed is:

1. A method for the removal of lipids and cholesterol from a protein material selected from the group consisting of egg and whey proteins comprising the steps of;
   (A) treating the protein with a polar extraction solvent comprising essentially of from 90% to 97% of a lower alcohol, from 3% to 10% water and from 0.010% to 1.0% of a food grade acid in concentrations selected to extract cholesterol and lipids from the protein and
   (B) removing the extraction solvent from the protein.

2. The method according to claim 1 wherein the acid is present at a concentration of from about 0.010% to about 0.20%.

3. The method according to claim 1 wherein the acid is selected from the group consisting of citric, acetic, phosphoric, tartaric, malic, lactic and fumaric acids.

4. The method according to claim 3 wherein the acid is citric acid.

5. The method according to claim 1 wherein the lower alcohol is ethanol.

6. The method according to claim 1 wherein the protein is treated with an extraction solvent consisting of about 90.9% ethanol, 9% water and 0.084% citric acid for 6 hours at about 52° C.

7. The method according to claim 1 wherein the protein is treated with an extraction solvent consisting of about 94.95% ethanol, 5% water and 0.050% citric acid for 4 hours at 40° C.

8. The method according to claim 1 wherein the protein material is whey protein.

9. The method according to claim 1 wherein the extraction solvent is removed by washing the protein material with ethanol.

* * * * *